Fig. 4

J. W. LIVERMORE.
TRACTOR.
APPLICATION FILED FEB. 18, 1919.

1,343,979.

Patented June 22, 1920.
6 SHEETS—SHEET 6.

Fig. 6

INVENTOR
John W. Livermore
BY
[signature] ATTORNEY

UNITED STATES PATENT OFFICE.

JOHN W. LIVERMORE, OF FRESNO, CALIFORNIA, ASSIGNOR TO LISENBY MANUFACTURING COMPANY, OF FRESNO, CALIFORNIA, A CORPORATION.

TRACTOR.

1,343,979.   Specification of Letters Patent.   Patented June 22, 1920.

Application filed February 18, 1919. Serial No. 277,779.

*To all whom it may concern:*

Be it known that I, JOHN W. LIVERMORE, a citizen of the United States of America, residing at Fresno, in the county of Fresno, State of California, have invented certain new and useful Improvements in Tractors; and I do declare the following to be a clear, full, and exact description of the same, reference being had to the accompanying drawings, and to the characters of reference marked thereon, which form a part of this application.

The object of the invention is to produce a tractor of the four wheel drive type in which the driving and steering means are free from a mass of complicated parts as is now the general rule in this particular type of motor vehicle. I aim to provide a simple and effective driving connection between the power unit of the tractor and the front and rear axles in combination with a direct, simple and durable means for turning both axles in a horizontal plane in opposite directions with respect to each other. By this means short and abrupt turns can be made with the tractor with all four wheels under power. This latter feature is very advantageous especially in vineyard and orchard work where the tractor must make short turns at the ends of rows.

The turning of both wheel units will also allow the draw bar to be so positioned as to cause the drawn implements to follow the circle of movement of the tractor without undue dragging or side strain.

Another object of the invention is to drive the wheel shafts from a common centrally positioned longitudinal drive shaft without the use of friction producing universal or knuckle joints and the like now commonly used.

A third object is to so arrange and connect the parts that the wheel axles may be turned in a horizontal plane simultaneously and by the use of a single steering wheel without the necessity of slowing down or cutting out the power of the engine on one side or the other by the interposition of hand operated clutches.

These objects, I accomplish by means of such structure and relative arrangement of the parts as will fully appear by a perusal of the following specification and claims.

On the drawings, similar characters of reference indicate corresponding parts in the several views.

Figure 1:
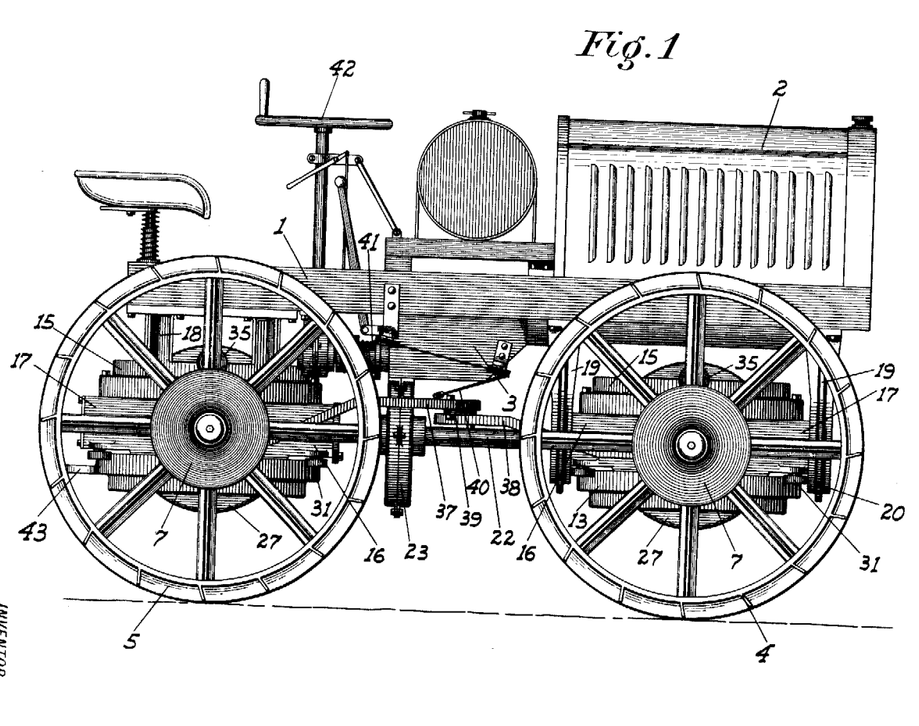
Figure 1 is a side elevation of the complete tractor.
Figure 2:
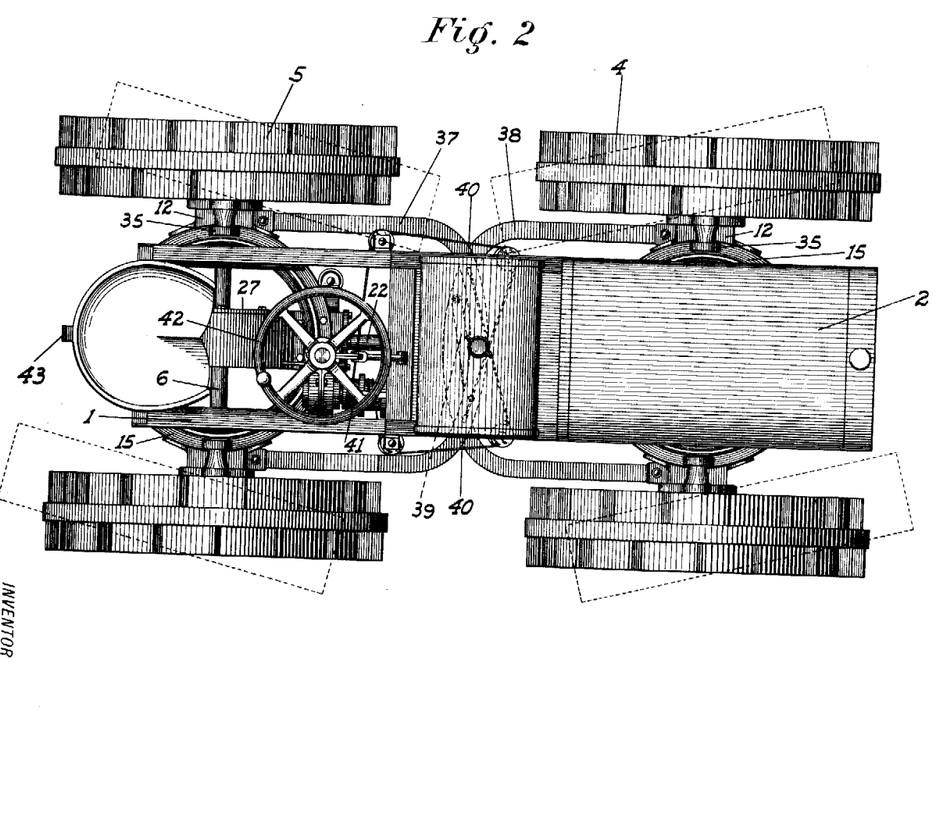
Fig. 2 is a top plan view of the same.
Figure 3:
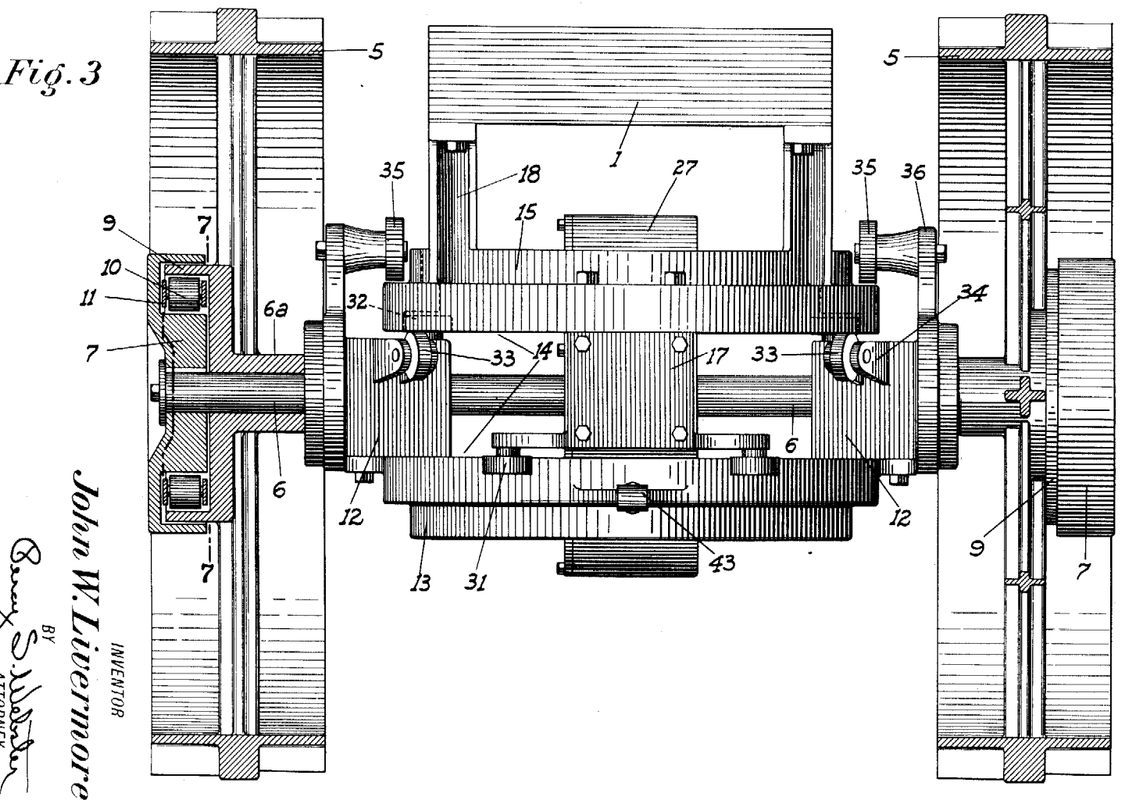
Fig. 3 is a rear view of the rear end wheel unit.
Figure 4:
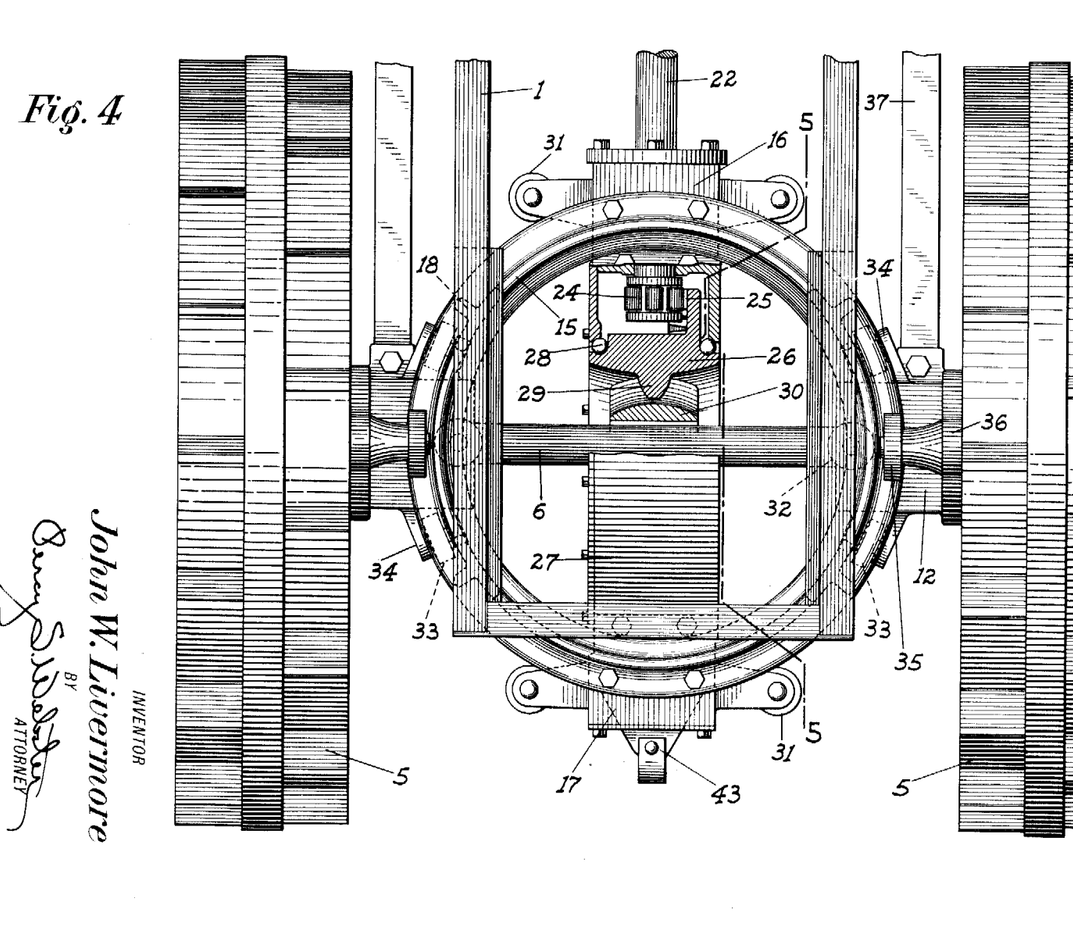
Fig. 4 is a top plan view of the same, partly broken out to show the driving gear connection.
Figures 5, 7:
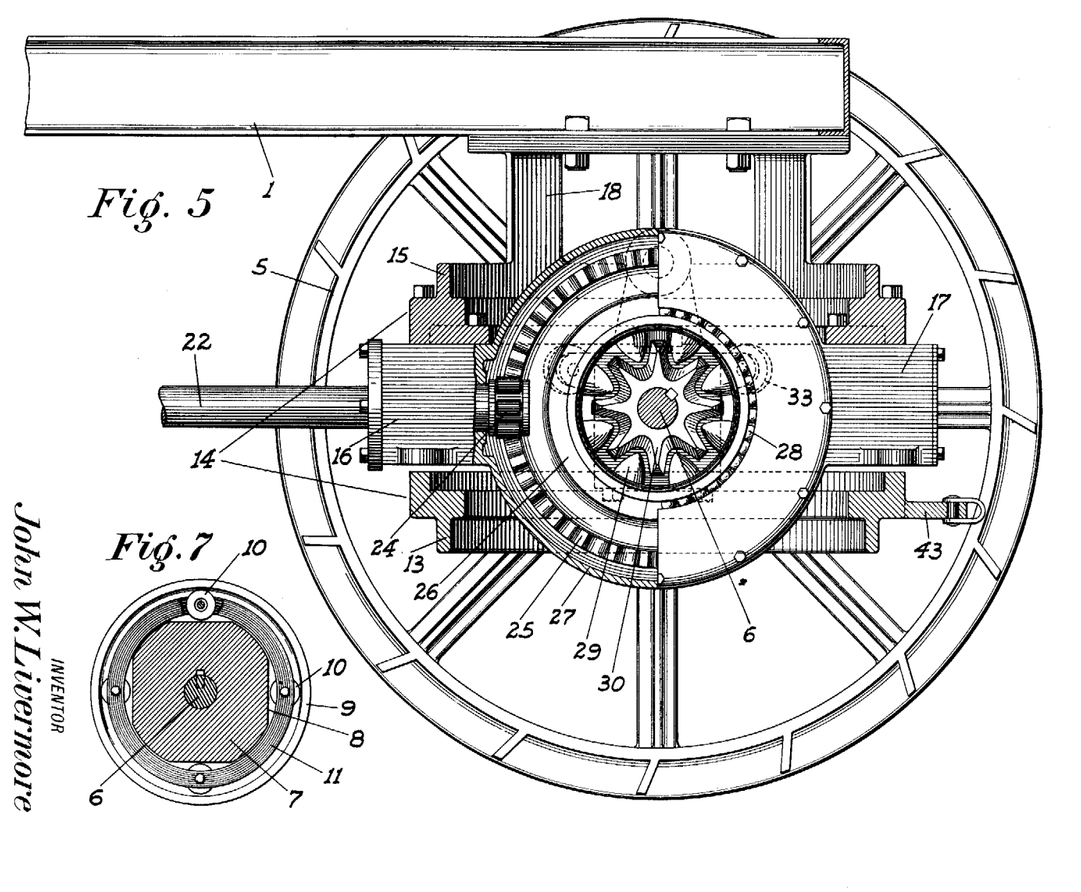
Fig. 5 is a longitudinal section of this wheel unit taken relatively on a line 5—5 of Fig. 4.
Fig. 7 is a detached side view of a clutch mechanism taken relatively on a line 7—7 of Fig. 3.
Figure 6:
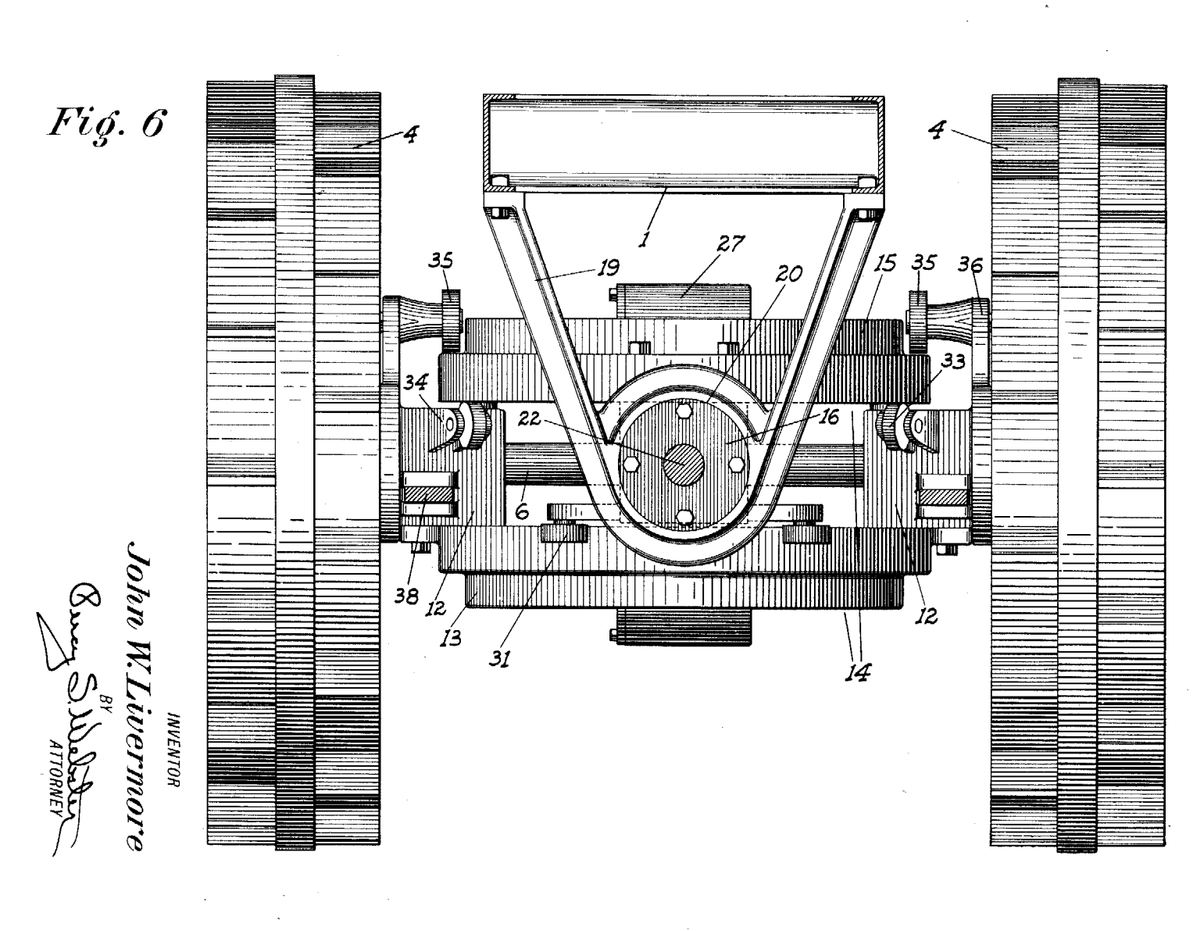
Fig. 6 is an end elevation of the front wheel unit, looking forward.

Referring now more particularly to the numerals of reference on the drawings, the numeral 1 indicates the frame of the tractor on which is mounted a power unit 2 preferably of the internal combustion type and operatively connected with the usual clutch and transmission box 3.

This frame and power plant is carried on two pairs of wheels 4 and 5. Each pair of wheels has a shaft 6 turnably mounted in the hubs 6ᵃ thereof, at each end of which shaft is keyed a cam 7 having a plurality of flat faces 8 alternating with the outer circular periphery thereof, which periphery is concentric with a drum 9 formed integral with the hub 6ᵃ. Between the drum and the flat faces of the cam 7 are positioned rollers 10 having a certain freedom of movement therebetween and held in spaced relation by bands 11. These rollers, however, are of too great a diameter to pass between the outer periphery of the cam and the drum so that when the cam turns with the shaft the rollers are squeezed between the cam and the drum and cause the wheel to turn, provided the shaft at the time is turning faster than the wheel. This form of clutch and its operation is more fully set forth in my copending application for patent, filed Feb. 17, 1919, Serial No. 277,490.

The shafts 6 are turnably mounted in journal boxes 12 bolted to or formed integral with the lower ring 13 of a turntable 14 and above the same.

Spaced from the lower ring 13 is the upper member 15 of the turntable of similar shape and concentric with the lower ring. A journal box 16 is secured to and under the ring 15, the box for the rear wheel unit being at the forward end of the ring and that for the front wheel unit being at the rear end thereof. While the drawings disclose these journal boxes at both ends, as at 17, the ones not used as such are added for the sake of interchangeability and uniformity of appearance.

The rear one of such rings 15 is rigidly secured to the frame 1 by standards 18 formed with the ring, while the ring 15 on the forward wheel unit is swivelly mounted to the frame transversely thereof by V-shaped members 19, one on each of the boxes 16 and 17, the hub 20 formed with the arms being turnably mounted on the projecting ends of these boxes, which in this case are turned circular for the purpose. This method of mounting the forward end of the tractor permits this end to tilt from side to side to negotiate roughness in the path of travel of the tractor.

Otherwise the construction and mechanism of the two wheel units and turntables is identical, and for the sake of simplicity I have hereafter described but one of such units, taking the rear unit for such description, as that one is more fully shown on the drawings.

Journaled in the boxes 16 is a centrally positioned common drive shaft 22 whose center line intersects those of the shafts 6, and which is operatively connected with the driving gear in the transmission box 3 by means of a reduction gear keyed to said shaft 22, this gear being housed in a casing 23 secured to the transmission box 3. The circular journal boxes on the forward wheel unit are of course concentric with the shaft 22, in order that this unit may swing about this shaft as a pivotal point.

On each end of the shaft 22 is secured a roller pinion 24 meshing with a large gear 25 which has a hollow hub 26 surrounding the shaft 6 concentric therewith but spaced considerably therefrom.

The gear 25 is turnably mounted in a casing 27 formed with the boxes 16 and 17 by means of ball bearings 28. In the hollow hub and formed integral therewith are a plurality of conical teeth 29 projecting inwardly and being on a vertical plane with the center line of the shaft 22. These teeth mesh with a pinion 30 keyed to the shaft 6, the top and bottom of the teeth of this pinion being so curved that the shaft 6 may turn about its pivotal point—which point is the center of the turntable and also the intersecting point of the shafts 6 and 22—without the teeth 29 binding therein.

The rings 13 and 15 are kept in alinement by rollers 31 mounted to the boxes 16 and 17 and bearing against the outer periphery of the ring 13 and by rollers 32 mounted to the boxes 12 and bearing against the inner face of the ring 15.

The rings 13 and 15 are held in spaced relation by rollers 33 which bear against the under side of the ring 15 and are mounted to bosses 34 on the sides of the boxes 12 on the ring 13. Rollers 35 mounted on bosses 36 projecting upwardly from the boxes 12 are adapted to bear on the upper rim of the ring 15 and prevent any tendency to upward movement of the same away from the ring 13. Turning motion is given to the lower rings 13 of the turntables 14 and the wheels connected thereto by means of flat U-shaped members 37 and 38 secured to lugs on the boxes 12 and projecting forward and rearward from the rear and front wheel units respectively.

The member 37 overlaps the member 38 at the U-bend thereof, and they are connected together by a bar 39 whereby they may be operated in unison but in opposite directions by some such means as cables 40 attached to the upper member 37 at opposed points thereon and wound oppositely about drums 41 turnably connected to a steering wheel 42 on the frame 1.

In operating, supposing the tractor to be stationary, if the engine clutch is thrown in, the power is transmitted to the shaft 22, thence to the gear 25 at both ends, thence to the pinions 30 and the shafts 6. This causes the flat faced cams 7 thereon to force the rollers 10 against the drums 9 to turn the wheels, as aforestated.

When it is desired to steer the tractor, the wheel 42 is turned to cause the members 37 and 38 to swing sidewise, taking the lower turntable rings 13 and the wheels 4 and 5 mounted thereto with them. A drawhead 43 is positioned at the rear end of the lower ring 13 of the rear wheel unit. To this drawhead may be attached wagons, plows or other implements. This drawhead of course turns in a horizontal plane with the turning of the wheels to steer the tractor, and assumes a position substantially on the center between the two arcs of turning of the tractor wheels. This feature tends to place the implement being pulled also in such curve of turning and makes it easy for the implement to make the turn without any side dragging thereof, as is always the case with fixed drawbars.

In this operation, the wheels on the outside of the curve of turning will be freed from the clutches in the wheels and will be free to turn on the shafts 6 to travel the greater distance necessary to make the turn.

During this operation, the pinions 30 turn on their pivotal points but remain constantly in mesh with the teeth 29, thus forming a universal driving means and enabling the power from the shaft 22 to be constantly applied to the shafts 6 while the wheels are being steered.

With this form of construction for four wheel drive tractors, it will be seen that I have eliminated the use of universal joints, knuckles, etc., or any hand operated clutches, other than that commonly used between the engine and its transmission.

Thus, from the foregoing description, it will readily be seen that I have produced such a device as substantially fulfils the objects of my invention as set forth herein.

While this specification sets forth in detail the present and preferred construction of the device, still in practice, such deviations from such detail may be resorted to as do not form a departure from the spirit of the invention, as defined by the appended claims.

Having thus described my invention, what I claim as new and useful and desire to secure by Letters Patent is:—

1. A tractor comprising a frame, a power unit thereon, a longitudinal rigid drive shaft central of the frame and in driving connection with the power unit, wheel supported axles normally at right angles to the drive shaft and on the same horizontal plane thereas, the axis of the drive shaft intersecting the transverse center line of the axles, pinions on the ends of the shaft meshing with floating gears concentric with the axles, and flexible driving means between the axles and the gears, such points of driving connection being in the plane of the intersection of the shaft with the axles, whereby the axles may be turned in a horizontal plane about such point of intersection as an axis.

2. A tractor comprising a body and frame, a journal box supported by the frame at each end thereof, a gear housing connected with each journal box, a gear mounted in each housing, a single rigid drive shaft journaled in said boxes and connected in driving relation with each gear and with the power unit of the tractor, and at right angles to said gears, an axle connected in flexible driving relation with each gear to allow of the rotation of such axles and permit them to be moved about their central vertical axes in a horizontal plane, and wheels mounted on the axles and supporting the tractor, the axles being in the same horizontal plane as the rigid shaft and the driving connection of the gear with the axle being in the plane of intersection of the shaft with the axle.

3. A tractor comprising a frame, a power unit mounted thereon, a turntable at each end of the frame, each turntable comprising a stationary and a turnable ring concentric with each other, and suitably spaced apart, journal boxes on the stationary rings, a common drive shaft journaled thereon positioned longitudinally and centrally of the frame under the same and being in driving connection with the power unit, means whereby the stationary ring on the rear turntable is rigidly secured to the frame, and means whereby the stationary ring on the forward turntable may move about the drive shaft as an axis.

4. A tractor comprising a frame, a power unit mounted thereon, a turntable at each end of the frame, each turntable comprising a stationary and a turnable ring concentric with each other, and suitably spaced apart, journal boxes on the stationary rings, a common drive shaft journaled thereon positioned longitudinally and centrally of the frame under the same and being in driving connection with the power unit, means whereby the stationary ring on the rear turntable is rigidly secured to the frame, and means whereby the stationary ring on the forward turntable may move about the drive shaft as an axis, such last named means comprising V-shaped members secured to the frame at each end of the turntable and having hubs thereon mounted on the journal box at the rear end of the ring and to a boss on the forward end, the journal and boss being turnable in the hubs and concentric with the shaft, whereby the turntable may have sidewise movement relative to the frame with the shaft as the axis of such movement.

5. A tractor comprising a frame, a power unit mounted thereon, a turntable at each end of the frame, each turntable comprising a stationary and a turnable ring concentric with each other and suitably spaced apart, journal boxes on the stationary rings, a common drive shaft journaled therein positioned longitudinally and centrally of the frame under the same and being in driving connection with the power unit, a roller pinion on each end of the shaft meshing with gears mounted in casings secured to the journal boxes, the gears being provided with hollow hubs, internal gear teeth in the hubs, such teeth being on the vertical plane of the center of the drive shaft, journal boxes on the turnable rings of the turntables transversely of the journal boxes on the stationary rings, axles journaled in the second named boxes and passing through the hollow hubs of the gears and intersecting the center line of the drive shaft and pinions on the axles in line with the drive shaft and meshing with the internal teeth in the hubs, the face of the pinions being curved to allow of freedom of movement thereof about the intersecting point of the shaft and axles as a pivotal point.

6. A tractor comprising a frame, a power unit mounted thereon, a turntable at each end of the frame, each turntable comprising a stationary and a turnable ring concentric with each other and suitably spaced apart, journal boxes on the stationary rings, a common drive shaft journaled therein positioned longitudinally and centrally of the frame under the same and being in driving connection with the power unit, a roller pinion on each end of the shaft meshing with gears mounted in casings secured to the journal boxes, the gears being provided with hollow hubs, internal gear teeth in the hubs, such teeth being on the vertical plane of the center of the drive shaft, journal boxes on the turnable rings of the turntables transversely of the journal boxes on the stationary rings, axles journaled in the second named boxes and passing through the hollow hubs of the gears and intersecting the center line of the drive shaft, and pinions on the axles in line with the drive shaft and meshing with the internal teeth in the hubs, the faces of the pinions being curved to allow of freedom of movement thereof about the intersecting point of the shaft and axles as a pivotal point, and means whereby the axles may be moved in a horizontal plane to form radii of the arc of turning of the tractor.

7. In a tractor, the combination with a wheel axle adapted to turn in a horizontal plane about its central vertical axis as a pivot, of a rigid drive shaft whose center line produced intersects the center line of the axle, and means whereby the power of the drive shaft may be transmitted to the axle irrespective of the angular position of the shaft relative to the axle, such means including a floating gear having a hollow hub surrounding the axle and concentric therewith, the gear meshing with a pinion on the shaft, internal gear teeth in the hubs, such teeth being on the vertical plane of the center of the axle, and pinions on the axle meshing with the internal teeth in the hubs, the faces of the pinions being curved to allow of freedom of movement thereof about the intersection of the shaft with the axle as a pivotal point.

In testimony whereof I affix my signature in presence of two witnesses.

JOHN W. LIVERMORE.

Witnesses.
 BEN H. JOHNSON,
 R. G. RETALLICK.

It is hereby certified that Letters Patent No. 1,343,979, granted June 22, 1920, upon the application of John W. Livermore, of Fresno, California, for an improvement in "Tractors," were erroneously issued to Lisenby Manufacturing Company, as sole owner of said invention, whereas said Letters Patent should have been issued to the inventor, *said Livermore, and Lisenby Manufacturing Company, jointly*, said corporation being assignee of *one-half* interest only, as shown by the records of assignments in this office; and that the said Letters Patent should be read with this correction therein that the same may conform to the record of the case in the Patent Office.

Signed and sealed this 31st day of August, A. D., 1920.

[SEAL.]

M. H. COULSTON,
*Acting Commissioner of Patents.*

Cl. 180—50.